Patented May 8, 1945

2,375,579

UNITED STATES PATENT OFFICE 2,375,579

LUBRICANTS

John A. Patterson and Rush F. McCleary, Beacon, N. Y., assignors to The Texas Company, New York, N. Y., a corporation of Delaware No Drawing. Application March 25, 1942,
Serial No. 436,081

8 Claims. (Cl. 252—32)

This invention relates to the use of metal derivatives of compositions obtained or derived from the Anacardium genus of the Anacardiaceae family in hydrocarbon oils, particularly petroleum oils, to improve the properties of the lubricants compounded therewith.

It is generally recognized that the recent developments in the automotive industry directed toward the increase in power output and efficiency of mechanical equipment have set up such severe and exacting operating conditions as to necessitate an improvement in the highly refined hydrocarbon oils used in the lubricating system thereof. Thus the increase in operating temperatures and engine speeds, together with reduced clearances between the moving parts and the use of hard-bearing alloys such as copper-lead, cadmium-silver, etc. have seriously accentuated such problems as corrosion, oxidation and varnish and lacquer formation with the resultant deleterious effect on the efficiency of the equipment. Previous attempts have been made to eliminate these deficiencies in the lubricants by incorporating in the highly refined hydrocarbon oils proportions of additive ingredients possessing inhibiting properties.

The additive ingredients of the present invention are prepared from the extracted oils obtained from the Anacardium genus of the Anacardiaceae family and include the compositions and constituents of such oils as cashew nut shell oil, marking nut shell oil, Japanese lac, etc. It is the consensus of the authorities on these extracted oils that the chemical composition thereof consists primarily of various types of aromatic derivatives such as anacardic acid ($C_{22}H_{32}O_3$), cardol ($C_{32}H_{52}O_4$), cardanol ($C_{20}H_{32}O$), anacardol ($C_{18}H_{30}O$) and urushiol ($C_{20}H_{30}O_2$).

The natural occurring cashew nut shell oil is described in Matiello, J. J., "Protective & Decorative Coatings," Chap. 2, (1941) as containing approximately 90% anacardic acid and 10% cardol when extracted from the shells by means of solvents. This composition is very unstable and is subject to polymerization, condensation and decomposition on heating.

The usual commercial methods of extracting the oil from the cashew nut shells are incidental to the extraction of the kernel. The cellular structure of the shell is destroyed by a thermal treatment such as a charring or carbonizing process which expels the oil and facilitates removal of the kernel. The extracted shell oil is collected as a dark, thick, viscous liquid whose chemical composition varies in accordance with the degree of heat used in the extraction process.

These thermally extracted oils are described as consisting primarily of anacardic acid, cardanol and cardol with cardanol predominating. The particular proportions of these components vary in accordance with the amount of heat used in the extraction process as, for example, when extracting at low temperatures of approximately 400° F., the extracted oil contains approximately 70% cardanol, whereas extracting at roasting temperatures yields an oil containing approximately 40-50% cardanol.

Duplication of these commercially extracted oils may be obtained by heat treatment of the solvent extracted oils. The amount or degree of decomposition may be controlled by the amount of heat and conditions of distillation. The physical constants of a representative sample of a commercial cashew nut shell oil obtained by thermal extraction are as follows:

Bromine No_____ 133
Hydroxyl No_____ 210
Neutralization No_____ 21

It has been discovered that the addition of an oil-soluble or oil-miscible metal derivative of a thermal extracted composition obtained or derived from the Anacardium genus of the Anacardiaceae family to a refined hydrocarbon oil provides a lubricant or a compounding lubricant which possesses improved resistance to sludge, varnish and lacquer formation of the hydrocarbon oil during service. The refined hydrocarbon oils which may be improved by these metal derivatives include the petroleum lubricating oils such as motor, Diesel, turbine and airplane oils, together with the refined hydrocarbon oils used in the preparation of industrial lubricants, greases, textile oils, etc.

The particular metals which are contemplated in the formation of the oil-soluble or oil-miscible metal derivatives include any of the following metals: sodium, potassium, lithium, calcium, barium, strontium, tin, bismuth, aluminum, zinc, magnesium, cadmium, lead, titanium, antimony, chromium, manganese, iron, cobalt, nickel and copper, with preference given to calcium, barium, tin and zinc.

The majority of these Anacardium oils are relatively unstable and depending upon the type of oil are very sensitive to polymerization, condensation and decomposition reactions. This may be overcome by hydrogenating the unsaturated constituents either prior to, or simultaneously with, or subsequent to the formation of the metal derivatives thereof.

One method of preparing the metal derivatives which simultaneously includes the partial hydrogenation of the composition is the reaction of a solution of the desired metal in liquid ammonia with the oil. This reaction results in a partial hydrogenation of the unsaturated constituents by means of the residual hydrogen displaced by the metal as evidenced by the decrease in bromine number.

The degree of neutralization may be varied according to the amount of metal reacted with the oil since the compositions apparently contain more than one hydroxyl and/or carboxyl groups. Any or all of these reactive groups may be neutralized to form the corresponding metal derivative.

Further, the thermal extracted oils may be modified in accordance with the desired improving properties required. This includes the incorporation of various inorganic constituents such as sulfur, halogen, nitrogen, and phosphorus in the form of radicals which are compatible with the compositions. As, for example, the anti-corrosive properties of the metal derivatives may be improved by adding sulfur to the compositions in the form of a sulfide, thioether, mercaptan, thiophosphate, etc.

It is to be understood that the term "metal derivative of a composition derived from a member of the Anacardium genus of the Anacardiaceae family" as appearing throughout the specification and claims includes the metal derivatives, e. g., the partially or completely neutralized reactive hydroxyl and/or carboxyl groups, of the compositions contained in the oils falling within the classification of the Anacardium genus of the Anacardiaceae family and including cashew nut shell oil, marking nut shell oil, Japanese lac, etc., together with the hydrogenated and/or further derivatives thereof containing such sulfur, halogen, nitrogen and phosphorus radicals which have heretofore been known to impart improving qualities.

These oil-soluble metal derivatives of the present invention may be incorporated in a hydrocarbon oil in amounts varying between 0.01 to 5.0% by weight of the finished lubricant. The particular proportions used depend upon the type of lubricant to be improved, the service for which the lubricant is intended, and the degree of improvement desired in the hydrocarbon oil. The preferred range of proportions in a mineral lubricating oil when used in a few of the more common services are as follows:

|  | Percent by weight of finished lubricant |
|---|---|
| Diesel lubricating oil | 0.5 –1.0 |
| Motor lubricating oil | 0.3 –0.6 |
| Heavy duty lubricating oil | 0.5 –2.5 |
| Turbine lubricating oil | 0.01–0.1 |
| Airplane lubricating oil | 0.2 –0.6 |

Of the Anacardium oils previously mentioned, cashew nut shell oil is preferred and the present invention is particularly concerned with the thermal extracted oil. The basic distinction between the solvent extracted and the thermal extracted cashew nut shell oil is the presence of cardanol in the thermal extracted oil. This material is present in varying proportions depending upon the conditions and degree of extraction.

The following examples are given to illustrate the preparation of two of the preferred types of metal derivatives:

Example I

A solution of 250 grams of thermal extracted cashew nut shell oil in 1000 cc. of toluene was added to a solution of 95 grams of stannous chloride in 2.5 liters of liquid ammonia with vigorous agitation. Upon completion of the addition, the mixture was stirred for three hours, then allowed to set overnight and the temperature gradually raised to room temperature. The warmed solution was filtered and the filtrate freed of solvent by heating in vacuo. The residue was dissolved in an equal weight of lubricating oil to form a clear 50% concentrate which analyzed 9.1% ash.

Other metal salts may be used in place of the stannous chloride of this example or a solution of a metal in the liquid ammonia may be used when partial hydrogenation is desired. However, the oil may also be subjected to hydrogenation, as for example, with a Raney nickel catalyst and/or reacted with other constituents to incorporate additional improving properties in the form of sulfur, chlorine, nitrogen and phosphorus containing radicals either prior or subsequent to neutralization with the metal.

Example II

A mixture of 86 grams of anhydrous barium hydroxide, 250 grams thermal extracted cashew nut shell oil and 500 cc. of benzene were stirred together and heated to refluxing temperature under an automatic water separator. The mixture was refluxed until no more water was evolved. 25 cc. of water was collected. The mass was filtered and the filtrate freed of solvent by heating in vacuo. The residual barium salt was dissolved in three times its weight of lubricating oil to form a 25% concentrate which analyzed 8.2% ash.

Here again other metal hydroxides may be used in place of the barium hydroxide of the example and other substituents in the form of sulfur, chlorine, nitrogen and phosphorus containing radicals and may be incorporated into the compositions of the oil by reactions either prior or subsequent to the formation of the metal derivative.

The effectiveness of the compounds of the present invention when incorporated in a mineral lubricating oil was demonstrated by runs in an automotive engine. This test was run in a standard Chevrolet engine operated on a block for 40 hours at 2500 R. P. M. and 50 M. P. H. or an equivalent of 2000 miles with a crankcase oil temperature of 275° F. and jacket temperature of 212° F. with a crankcase ventilation of one cubic foot of air per minute. The test was stopped at a 10-hour period and started immediately. At 20 hours, the engine was stopped and rested for four hours. At 30 hours, the engine was again stopped and rested for four hours. At 40 hours, the test was terminated, the engine was taken down, the pistons removed and the amount of varnish deposit determined on the oil rings, piston skirt, rocker arm, valve cover plate and pan. This was accomplished in each case by washing first with precipitation naphtha to remove the retained oil, then washing with acetone to remove the bulk of the varnish deposit. The acetone solution was then evaporated to dryness and the residue extracted with precipitation naphtha to remove the remaining traces of oil. The residue was again taken up in an acetone solution and filtered to remove suspended deposits and finally evaporated to dryness.

The following results were obtained on an uninhibited reference oil which was a solvent-refined, dewaxed, Mid-Continent lubricating oil of an S. A. E. 30 grade, together with said oil, containing the tin derivative of thermal extracted cashew nut shell oil as prepared in Example I:

|  | Visual piston varnish | Piston skirt varnish, mgs. | Ring varnish, mgs. | Under piston deposit, mgs. | Rocker arm, valve cover plate and pan deposits, mg., acetone | |
|---|---|---|---|---|---|---|
|  |  |  |  |  | Sol. | Insol. |
| Reference oil | Medium | 580 | 920 | 5,780 | 2,710 | 2,930 |
| Reference oil +0.5 per cent tin salt of thermal extracted cashew nut shell oil (Example I) | Light | 230 | 280 | 3,090 | 2,140 | 2,480 |

The hydrocarbon oils to which the oil-soluble metal derivatives of the present invention are added may be either in the crude form or partially or highly refined and may contain other additive ingredients such as dyes, metal soaps, pour depressants, thickeners, V. I. improvers, oiliness agents, extreme pressure agents, sludge dispersers, oxidation inhibitors, and corrosion inhibitors such as sulfurized hydrocarbons, etc.

Obviously many modifications and variations of the invention, as hereinbefore set forth, may be made without departing from the spirit and scope thereof and, therefore, only such limitations should be imposed as are indicated in the appended claims.

We claim:

1. A lubricant comprising a hydrocarbon oil having incorporated therein 0.01–5.0% by weight of an oil-soluble metal derivative of an oil thermally extracted from a member of the Anacardium genus of the Anacardiaceae family.

2. A lubricant comprising a hydrocarbon oil and 0.01–5.0% by weight of an oil-soluble metal derivative of a hydrogenated oil thermally extracted from a member of the Anacardium genus of the Anacardiaceae family.

3. A lubricant comprising a hydrocarbon oil and 0.01–5.0% by weight of an oil-soluble metal derivative of thermally extracted cashew nut shell oil.

4. A lubricant comprising a hydrocarbon oil and 0.01–5.0% by weight of an oil-soluble metal derivative of a hydrogenated thermally extracted cashew nut shell oil.

5. A lubricant comprising a mineral lubricating oil, a small amount, sufficient to impart antioxidant properties to said oil, of an oil-soluble metal derivative of an oil thermally extracted from a member of the Anacardium genus of the Anacardiaceae family.

6. A lubricant comprising a hydrocarbon oil and 0.01–5.0% by weight of an oil-soluble alkaline earth metal derivative of thermally extracted cashew nut shell oil.

7. A lubricant comprising a hydrocarbon oil and 0.01–5.0% by weight of an oil-soluble tin derivative of thermally extracted cashew nut shell oil.

8. A lubricant comprising a hydrocarbon oil and 0.01–5.0% by weight of an oil-soluble zinc derivative of thermally extracted cashew nut shell oil.

JOHN A. PATTERSON.
RUSH F. McCLEARY.